(12) United States Patent
Tourapis et al.

(10) Patent No.: US 8,879,628 B2
(45) Date of Patent: Nov. 4, 2014

(54) FLOATING POINT VIDEO CODING

(75) Inventors: Alexandros Tourapis, Milpitas, CA (US); Yuwen He, San Diego, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 46 days.

(21) Appl. No.: 14/000,861

(22) PCT Filed: Feb. 21, 2012

(86) PCT No.: PCT/US2012/025951
§ 371 (c)(1),
(2), (4) Date: Aug. 21, 2013

(87) PCT Pub. No.: WO2012/115973
PCT Pub. Date: Aug. 30, 2012

(65) Prior Publication Data
US 2013/0329795 A1    Dec. 12, 2013

Related U.S. Application Data

(60) Provisional application No. 61/444,885, filed on Feb. 21, 2011.

(51) Int. Cl.
| | | |
|---|---|---|
| H04N 7/12 | (2006.01) |
| H04N 11/02 | (2006.01) |
| H04N 11/04 | (2006.01) |
| H04N 5/46 | (2006.01) |
| H04N 5/228 | (2006.01) |

(52) U.S. Cl.
USPC ............... 375/240.12; 348/557; 348/222.1

(58) Field of Classification Search
CPC ............... H04N 19/00769; H04N 19/00884; H04N 19/00909; H04N 19/00569; H04N 19/00781; H04N 19/00896; H04N 19/00478
USPC .................................. 375/240.12
See application file for complete search history.

(56) References Cited

U.S. PATENT DOCUMENTS 5,109,417 A    4/1992  Davidson
6,049,343 A    4/2000  Abe
(Continued)

FOREIGN PATENT DOCUMENTS

GB    2396929    7/2004
JP    10336037   12/1998
(Continued)

OTHER PUBLICATIONS

Akramullah, S. et al, "Optimization of H.263 Video Encoding Using a Single Processor Computer: Performance Tradeoffs and Benchmarking," IEEE Transactions on Circuits and Systems for Video Technology, vol. 11, No. 8, Aug. 2001.

(Continued)

Primary Examiner — Hee-Yong Kim

(57) ABSTRACT

Floating point video coding is described. In particular, a video encoder/decoder and methods for floating point video coding are discussed. Floating point video coding can be used in the video encoder and decoder to support video content, such as HDR content. Specifically, a video codec structure such as H.264/AVC can be modified in order to support floating point video coding. Within any component of a codec system, some operations can be performed at floating point precision whereas other operations can be performed at fixed point precision.

25 Claims, 5 Drawing Sheets

(56) References Cited

U.S. PATENT DOCUMENTS

| | | | |
|---|---|---|---|
| 6,359,619 | B1 | 3/2002 | Waters |
| 8,666,186 | B1* | 3/2014 | Rasche .................. 382/244 |
| 2006/0002479 | A1 | 1/2006 | Fernandes |
| 2006/0002611 | A1 | 1/2006 | Mantiuk |
| 2007/0160305 | A1* | 7/2007 | Demos .................. 382/244 |
| 2008/0001961 | A1 | 1/2008 | Roimela |
| 2008/0198266 | A1 | 8/2008 | Kurane |
| 2008/0198935 | A1 | 8/2008 | Srinivasan |
| 2008/0291289 | A1 | 11/2008 | Kurane |
| 2009/0182795 | A1 | 7/2009 | Dobbek |

FOREIGN PATENT DOCUMENTS

| | | |
|---|---|---|
| JP | 2008-071170 | 3/2008 |
| WO | 2007082562 | 7/2007 |

OTHER PUBLICATIONS

Demos, G. "High Quality, Wide Dynamic Range, Compression System," SMPTE Technical Conference and Exhibition, Oct. 2004.

Demos, G., "Wide Dynamic Range, High Precision, Lossless Layered Coding Method," SMPTE Advanced Motion Imaging and VSF VidTrans, 2006.

Manders, C. et al, "A Compression Method for Arbitrary Precision Floating-Point Images," IEEE, 2007.

Groza, V., "High-Resolution Floating-Point ADC," IEEE Transactions on Intrumentation and Measurement, vol. 50, No. 6, Dec. 2001.

Shi, C. et al, "Floating-Point to Fixed-Point Conversion with Decision Errors Due to Quantizaion," IEEE, 2004.

Roimela, K. et al, "High Dynamic Range Texture Compression," 2006.

Motra, A. et al, "An Adaptive Logluv Transform for High Dynamic Range Video Compression," IEEE, Sep. 29, 2010.

Ward, G. "High Dynamic Range Image Encodings" Undated.

Chujoh, T. et al, "Internal Bit Depth Increase for Coding Efficiency," Jan. 14, 2007.

"Generic Coding of Moving Pictures and Associated Audio Information—Part 2: Video," ITU-T Rec. H.262 and ISO/IEC 13818-2 (MPEG-2 Video), ITU-T and ISO/IEC JTC Nov. 1, 1994.

ITU-T Rec. H.264 "Advanced Video Coding for Generic Audiovisual Services," Mar. 2010.

Sullivan, G. et al, "Text of ISO/IEC 14496 10 Advanced Video Coding 3rd Edition," ISO/IEC JTC 1/SC 29/WG11 N6540.doc, Jul. 4, 2004.

Wiegand, T. et al, Joint Draft 11 of SVC Amendment, Joint Video Team, Doc. JVT X201, Jul. 2007.

Lim, K. et al, "Text Description of Joint Model Reference Encoding Methods and Decoding Concealment Methods," ISO/IEC JTC 1/SC 29/WG11 JVT-R095.doc, Jan. 17, 2004.

Kainz, F., "Open EXR File Layout," Industrial Light and Magic, Mar. 13, 2013.

Wikipedia, "Digital Division".

Suehring, JVT Reference Software Version JM13.2.

Gish, W. et al. "10-bit and 12-bit Sample Depth" ISO/IEC JTC 1/SC 29/WG11 JVT-E048, Oct. 2002.

* cited by examiner

FLOATING POINT VIDEO CODING

CROSS-REFERENCE TO RELATED APPLICATIONS

This application is the U.S. national stage of International Application PCT/US2012/025951 filed 21 Feb. 2012, which in turn claims priority to U.S. Provisional Patent Application No. 61/444,885 filed 21 Feb. 2011, which is incorporated herein by reference in its entirety.

TECHNICAL FIELD

The disclosure relates generally to video processing. More specifically, it relates to floating point video coding.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

DESCRIPTION OF EXAMPLE EMBODIMENTS

Figure 1:
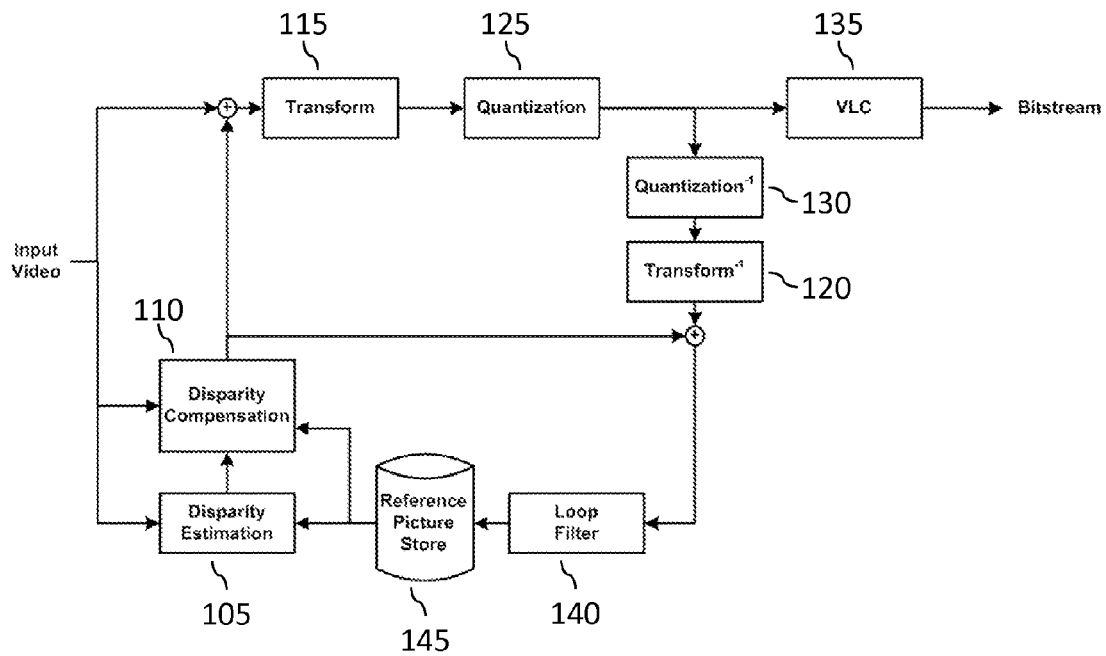
FIG. 1 shows an exemplary implementation of a video encoder.

According to a first aspect of the disclosure, a method for encoding an input video into a bitstream is provided, the input video comprising image data, the method comprising: a) performing disparity estimation and disparity compensation based on reference pictures from a reference picture buffer and input pictures of the input video to provide a plurality of prediction pictures or regions; b) taking a difference between the input pictures of the input video and pictures or regions in the plurality of prediction pictures or regions to provide residual information; c) converting the residual information from a floating point representation to a fixed point representation to provide converted residual information; d) performing transformation and quantization on the converted residual information to obtain processed residual information; and e) performing entropy encoding on the processed residual information to generate the bitstream.

According to a second aspect of the disclosure, a method for encoding an input video into a bitstream is provided, the input video comprising image data, the method comprising: a) performing disparity estimation and disparity compensation based on reference pictures from a reference picture buffer and input pictures of the input video to provide a plurality of prediction pictures or regions; b) taking a difference between the input pictures of the input video and pictures or regions in the plurality of prediction pictures or regions to provide residual information; c) performing transformation on the residual information to provide transformed residual information; d) converting the transformed residual information from a floating point representation to a fixed point representation to provide a converted residual information; e) performing quantization on the converted residual information to provide quantized residual information; and f) performing entropy encoding on the quantized residual information to obtain the bitstream.

According to a third aspect of the disclosure, a method for decoding a bitstream to obtain an output image is provided, comprising: a) providing the bitstream, wherein the bitstream comprises encoded image data; b) performing entropy decoding on the bitstream to obtain a processed image; c) performing inverse quantization and inverse transformation on the processed image to obtain a non-transformed image; d) converting the non-transformed image from a fixed point representation to a floating point representation to provide a converted image; and e) performing disparity compensation based on the processed image, the converted image, and reference pictures from a reference picture buffer to obtain a reconstructed image, wherein the reconstructed image comprises the output image.

According to a fourth aspect of the disclosure, a method for decoding a bitstream to obtain an output image is provided, comprising: a) providing the bitstream, wherein the bitstream comprises encoded image data; b) performing entropy decoding on the bitstream to obtain a processed image; c) performing disparity compensation based on the processed image and reference pictures from a reference picture buffer to obtain a disparity compensated image; d) performing inverse quantization and inverse transformation on the processed image to obtain a non-transformed image; e) converting the non-transformed image from a fixed point representation to a floating point representation to obtain a converted image; and f) generating a reconstructed image based on the disparity compensated image and the converted image, wherein the reconstructed image comprises the output image.

According to a fifth aspect of the disclosure, a method for decoding a bitstream to obtain an output image is provided, comprising: a) providing the bitstream, wherein the bitstream comprises encoded image data; b) performing entropy decoding on the bitstream to provide a processed image; c) performing inverse quantization on the processed image to obtain a non-quantized image; d) converting the non-quantized image from a fixed point representation to a floating point representation to provide a converted image; e) performing inverse transformation on the converted image to provide a non-transformed image; and f) performing disparity compensation based on the processed image, the non-transformed image, and reference pictures from a reference picture buffer to provide a reconstructed image, wherein the reconstructed image comprises the output image.

According to a sixth aspect of the disclosure, a method for decoding a bitstream to obtain an output image is provided, comprising: a) providing the bitstream, wherein the bitstream comprises encoded image data; b) performing entropy decoding on the bitstream to provide a processed image; c) performing disparity compensation based on the processed image and reference pictures from a reference picture buffer to provide a disparity compensated image, d) performing inverse quantization on the processed image to obtain a non-quantized image; e) converting the non-quantized image from a fixed point representation to a floating point representation to provide a converted image; f) performing inverse transformation on the converted image to provide a non-transformed image; and g) generating a reconstructed image based on the disparity compensated image and the non-transformed image, wherein the reconstructed image comprises the output image.

According to a seventh aspect of the disclosure, a method for generating a new reconstructed reference picture adapted to be stored in a reference picture buffer is provided, the new reconstructed reference picture generated from an input video comprising image data, the method comprising: a) performing disparity estimation and disparity compensation based on reference pictures from the reference picture buffer and input pictures of the input video to provide a plurality of prediction pictures or regions; b) taking a difference between the input pictures of the input video and pictures or regions in the plurality of prediction pictures or regions to provide a first set of residual information; c) converting the first set of residual information from a floating point representation to a fixed point representation to provide a first set of converted residual information; d) performing transformation and quantization on the first set of converted residual information to obtain a first set of processed residual information; e) performing inverse quantization and inverse transformation on the first set of processed residual information to obtain a second set of residual information; f) converting the second set of residual information from a fixed point representation to a floating point representation to provide a second set of processed residual information; and g) generating the new reconstructed reference picture based on the plurality of prediction pictures or regions and the second set of processed residual information, wherein the new reconstructed reference picture is adapted to be stored in the reference picture buffer.

According to an eighth aspect of the disclosure, a method for generating a new reconstructed reference picture adapted to be stored in a reference picture buffer is provided, the new reconstructed reference picture generated from an input video comprising image data, the method comprising: a) performing disparity estimation and disparity compensation based on reference pictures from a reference picture buffer and input pictures of the input video to obtain a plurality of prediction pictures or regions; b) taking a difference between the input pictures of the input video and pictures or regions in the plurality of prediction pictures or regions to provide a first set of residual information; c) performing transformation of the first set of residual information to provide a first set of transformed residual information; d) converting the first set of transformed residual information from a floating point representation to a fixed point representation to provide a first set of converted residual information; e) performing quantization of the first set of converted residual information to obtain a first set of processed residual information; f) performing inverse quantization on the first set of processed residual information to provide a second set of residual information; g) converting the second set of residual information from a fixed point representation to a floating point representation to obtain a second set of converted residual information; h) performing inverse transformation on the second set of converted residual information to provide a second set of processed residual information; and i) generating the new reconstructed reference picture based on the plurality of prediction pictures or regions and the second set of processed residual information, wherein the new reconstructed reference picture is adapted to be stored in the reference picture buffer.

According to a ninth aspect of the disclosure, an encoder adapted to receive an input video and output a bitstream is provided, the input video comprising image data, the encoder comprising: a disparity estimation unit, wherein the disparity estimation unit is adapted to determine disparity parameters based on reference pictures of a reference picture buffer and input pictures of the input video; a disparity compensation unit connected with the disparity estimation unit, wherein the disparity compensation unit is adapted to generate prediction pictures or regions based on the disparity parameters; a converting unit connected with the disparity compensation unit, wherein the converting unit is adapted to convert a difference between the input pictures of the input video and the prediction pictures or regions from a floating point representation to a fixed point representation, and wherein the difference is residual information; a transforming unit connected with the converting unit, wherein the transforming unit transforms the residual information to obtain transformed information; a quantizing unit connected with the transforming unit, wherein the quantizing unit quantizes the transformed information to obtain quantized information; and an entropy encoding unit connected with the quantizing unit, wherein the entropy encoding unit is adapted to generate the bitstream from the quantized information.

According to a tenth aspect of the disclosure, an encoder adapted to receive an input video and output a bitstream is provided, the input video comprising image data, the encoder comprising: a disparity estimation unit, wherein the disparity estimation unit is adapted to determine disparity parameters based on reference pictures of a reference picture buffer and input pictures of the input video; a disparity compensation unit connected with the disparity estimation unit, wherein the disparity compensation unit is adapted to generate prediction pictures or regions based on the disparity parameters; a transforming unit connected with the disparity compensation unit, wherein an input to the transforming unit is based on a difference between the input pictures of the input video and the prediction pictures or regions, and wherein the difference is residual information; a converting unit connected with the transforming unit, wherein the converting unit is adapted to convert the residual information from the transforming unit from a floating point representation to a fixed point representation to obtain converted information; a quantizing unit connected with the converting unit, wherein the quantizing unit quantizes the converted information to obtain quantized information; and an entropy encoding unit connected with the quantizing unit, wherein the entropy encoding unit is adapted to generate the bitstream from the quantized information.

According to an eleventh aspect of the disclosure, a decoder adapted to receive a bitstream from an encoder and output an output image is provided, the bitstream comprising encoded image data, the decoder comprising: an entropy decoding unit, wherein an input to the entropy decoding unit comprises the bitstream; an inverse quantizing unit connected with the entropy decoding unit, wherein the quantizing unit is adapted to remove quantization performed by the encoder; an inverse transforming unit connected with the inverse quantizing unit, wherein the inverse transforming unit is adapted to remove transformation performed by the encoder; a converting unit connected with the transforming unit, wherein the converting unit is adapted to convert an input from the transforming unit from a fixed point representation to a floating point representation; and a disparity compensation unit connected with the entropy decoding unit, wherein an input to the disparity compensation unit is based on an output of the entropy decoding unit, an output of the converting unit, and reference pictures of a reference picture buffer and/or regions within the reference pictures, wherein the output image of the decoder is based on an output of the disparity compensation unit, the output of the converting unit, and the reference pictures of the reference picture buffer and/or regions within the reference pictures.

According to a twelfth aspect of the disclosure, a decoder adapted to receive a bitstream from an encoder and output an output image is provided, the bitstream comprising encoded image data, the decoder comprising: an entropy decoding unit, wherein an input to the entropy decoding unit comprises the bitstream; an inverse quantizing unit connected with the entropy decoding unit, wherein the inverse quantizing unit is adapted to remove quantization performed by the encoder; a converting unit connected with the inverse quantizing unit, wherein the converting unit is adapted to convert an input from the inverse quantizing unit from a fixed point representation to a floating point representation; an inverse transforming unit connected with the converting unit, wherein the inverse transforming unit removes transformation performed by the encoder; and a disparity compensation unit connected with the entropy decoding unit, wherein an input to the disparity compensation unit is based on an output of the entropy decoding unit, an output of the inverse transforming unit, and reference pictures of a reference picture buffer and/or regions within the reference pictures, wherein the output image of the decoder is based on an output of the disparity compensation unit, the output of the inverse transforming unit, and the reference pictures of the reference picture buffer and/or regions within the reference pictures.

Most existing codecs such as the MPEG-2 and H.264/AVC video coding standards are integer based codecs. These integer based codecs only support fixed point input data, and in general consider fixed point operations for coding such fixed point data. Floating point operations have been performed to a limited extent using these integer based codecs. For instance, in older codecs such as MPEG-2 and MPEG-4 ASP, operations such as performing DCT transforms may be performed as floating point operations. However, in general for these older codecs, such floating point operations are avoided and fixed point approximations are used instead. Fixed point approximations are generally used to eliminate mismatches between floating point operations due to inconsistencies in implementation of floating point arithmetic across different devices and systems as well as due to lower complexity generally associated with fixed point processing operations.

On the other hand, a floating point or an adaptive precision codec would be more amenable to supporting content with higher dynamic range, such as high dynamic range (HDR) content, than the fixed point codec. Currently, most HDR and HDR-like content available are delivered using OpenEXR's "half" float per component format (see reference [1], incorporated herein by reference in its entirety). OpenEXR provides rudimentary lossy compression, thus generally resulting in poor coding efficiency. A floating point lossy codec with higher efficiency, similar to efficiency of fixed point data codecs like H.264, would be desirable since such a codec would enable efficient compression and delivery/distribution of floating point data. The floating point lossy codec should be capable of considering not only still images but also moving images.

As used in this disclosure, a "floating point codec" refers to a codec that supports floating point input. Operations performed by the floating point codec can be floating point or fixed point operations of varying precision, depending on desired precision of any particular computation which can be indicated implicitly or explicitly. It should be noted that floating point codecs can involve both content with higher dynamic range as well as content with lower dynamic range.

An "adaptive precision codec" refers to a codec, either fixed point or floating point, where precisions used in representing image signals as well as operations performed on these image signals can be adjusted and the precisions can be encoded in a bitstream at an encoder and signaled to a decoder. The precisions can also be inferred by the decoder based on encoded image signals received by the decoder. Consequently, for an image that includes data within a certain range of values, precisions used to represent the image and/or precisions used in operations on the image can be selected based on the range of values of the data in the current image or past images.

Additionally, as used in this disclosure, the terms "picture" and "image" are used interchangeably. For purposes of discussion, various processes occur at the picture or image level. However, the processes to be discussed in this disclosure can be applied, for instance, to a group of pictures as well as regions, macroblocks, blocks, or pixels within a picture. Consequently, the terms "picture" and "image" also refer to a group of pictures as well as regions, macroblocks (e.g., 4×4, 8×8, 16×16), blocks, or pixels within a picture. An exemplary method of segmenting a picture into regions, which can be of any shape, takes into consideration image characteristics. For example, a region within a picture can be a portion of the picture that contains similar image characteristics. Specifically, a region can be one or more pixels, macroblocks, blocks, or combination thereof within a picture that contains the same or similar chroma information, luma information, and so forth. The region can also be an entire picture. As an example, a single region can encompass an entire picture when the picture in its entirety is of one color or essentially one color.

FIG. 1 shows an exemplary implementation of a video encoder. The video encoder may comprise various components, including but not limited to:
- a disparity estimation module (105), performing operations such as mode decision/partition prediction type selection and motion/reference index estimation, weighted prediction parameter estimation, intra prediction, and so forth, which tries to determine from a large set of possible prediction modes which mode is most appropriate and efficient to use for a particular application or given certain performance requirements (e.g., quality, bitrate, cost, complexity, and any combination thereof);
- a disparity compensation module (110), which, given disparity parameters and previously reconstructed samples/information, tries to generate a prediction for a current block or image;
- forward and inverse transform (115, 120) and quantization (125, 130) components, which are used to encode any residual/error information that may remain after prediction;
- loop filtering (140) (also referred to as in-loop filtering), which is used to perform additional processing/filtering after reconstruction of the data to reduce coding artifacts and improve subjective (primarily) and objective quality;
- reference buffer memory (145), which is accessed and appropriately controlled for prediction purposes; and
- entropy coding modules (135), which are used to losslessly compress the various information involved in reconstructing the image data (including but not limited to disparity estimation information, transformed and quantized residual data, loop filtering control parameters, header information, etc.).

Figure 2:
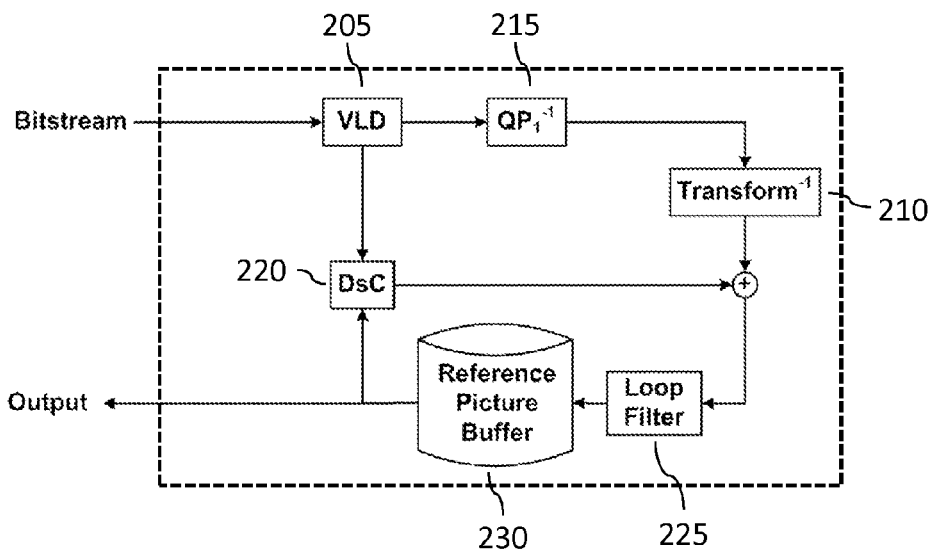
FIG. 2 shows an exemplary implementation of a video decoder that is adapted to decode information encoded with the video encoder shown in FIG. 1.

FIG. 2 shows an exemplary implementation of a video decoder that is adapted to decode information encoded with the video encoder of FIG. 1. The video decoder has similar components to those found in the video encoder of FIG. 1. The video decoder can comprise, for instance, an entropy decoding module (205), inverse transform (210) and quantization (215) components, a disparity compensation module (220), a loop filter (225), and reference buffer memory (230) for prediction purposes.

Existing codecs have primarily considered operations using fixed point arithmetic for a variety of reasons including complexity/implementation, memory, original representation of the video content, and so forth. Consideration of codecs beyond the original video content representation format can improve performance, especially at higher bitrates. For instance, 8 bit 4:2:0 YUV content can be encoded using higher precision and yield improved coding performance. The improved performance can be primarily an outcome of higher accuracy in prediction processes, which involve processes such as disparity estimation and compensation. Higher accuracy can be due to, for instance, employing more accurate interpolation filters; employing higher precision intra prediction, bi prediction, and/or weighted bi-prediction; and so forth.

Before discussing embodiments of floating point codecs, some basic differences between fixed point and floating point numbers are mentioned.

Fixed point numbers can be categorized as either unsigned or signed numbers. Unsigned numbers are useful for representing images while signed numbers are useful for representing residuals, transformed coefficients, motion vectors, weighted prediction parameters, and other quantities that may be either positive or negative. Two's complement representation for signed numbers is commonly used since it generally allows for easier implementation of addition and subtraction operations compared to one's complement representations. The two's complement representation allows 2N possible numbers to be represented with a range of $-2N-1$ to $2N-1 -1$.

An example of an unsigned char (8 bits) representation of a decimal number 101 is shown below:

| x | 0 | 1 | 1 | 0 | 0 | 1 | 0 | 1 |
|---|---|---|---|---|---|---|---|---|

Two examples of signed char (8 bits) representations, using the two's complement representation, of decimal numbers 101 and −27 are shown below:

| x0 | 0 | 1 | 1 | 0 | 0 | 1 | 0 | 1 |
|----|---|---|---|---|---|---|---|---|
| x1 | 1 | 1 | 1 | 0 | 0 | 1 | 0 | 1 |
| x | b7 Sign | b6 | b5 | b4 | b3 | b2 | b1 | b0 |

Floating point numbers are represented differently. A floating point number consists of a first bit representing the sign of a number, followed by N bits representing the mantissa or significand, and ended with M bits representing the exponent. A bias is commonly used to enable representation of very small numbers. Actual value of the floating point number represented using the above format can be computed as:

An example of a floating point number using 10 bits is shown below:

| x | 0 | 1 | 1 | 0 | 0 | 1 | 0 | 1 | 0 | 1 |
|---|---|---|---|---|---|---|---|---|---|---|
|  | Sign | Significand | | Exponent (bias = −3) | | | | | | |

Specifically, the floating point number given above has 1 bit for the sign, 6 bits for the significand, and 3 bits for the exponent.

A benefit of using floating point representations versus fixed point representations is that floating point representations can support a much wider range of values given the same number of bits. Additionally, many modern processors, including graphics processing units (GPU), support specialized instructions, such as Intel's Streaming SIMD Extensions, to speed up processing operations for floating point numbers. However, it should be noted that use of higher precision integer types, such as int32 or int64, can also be used to support a wide range of values.

As previously mentioned, most HDR and HDR-like content available are delivered using OpenEXR's "half" float per component format. However, higher dynamic range can be obtained through use of higher precision floating point types, such as single precision and double precision, as well as through use of higher precision integer types, such as int32 and int64. Table 1 shows different floating point types.

TABLE 1

| Floating point types | | | | |
|---|---|---|---|---|
|  | Sign | Exponent | Significand | Bias |
| Half Precision | 1 [15] | 5 [14-10] | 10 [9-0] | 15 |
| Single Precision | 1 [31] | 8 [30-23] | 23 [22-0] | 127 |
| Double Precision | 1 [63] | 11 [62-52] | 52 [51-0] | 1023 |

As shown above, double precision has more bits allocated for exponent information and significand information, 11 bits and 52 bits respectively, than half precision and single precision.

For floating point numbers, operations such as addition and subtraction can be performed by first representing both numbers with a same exponent. Multiplication can be performed by multiplying the significands and adding the exponents. Division is done in a similar but generally more complex manner.

In several embodiments of the present disclosure, new extensions are provided that support floating point data and floating point operations and are adapted for use with a codec based on the MPEG-4 AVC video coding standard or codecs based on other coding standards or methods. As an example, these extensions can be implemented directly on video coding software such as the JM reference software of the MPEG-4 AVC standard. Additionally, other video coding software and hardware based on the MPEG-4 AVC standard as well as video coding software and hardware based on other codecs can be similarly extended. Similar extensions can be, for example, introduced to other coding technologies, such as code based on the upcoming HEVC video coding standard or VC1 and VP8, and enable these other coding technologies to efficiently encode floating point data.

Figure 3:
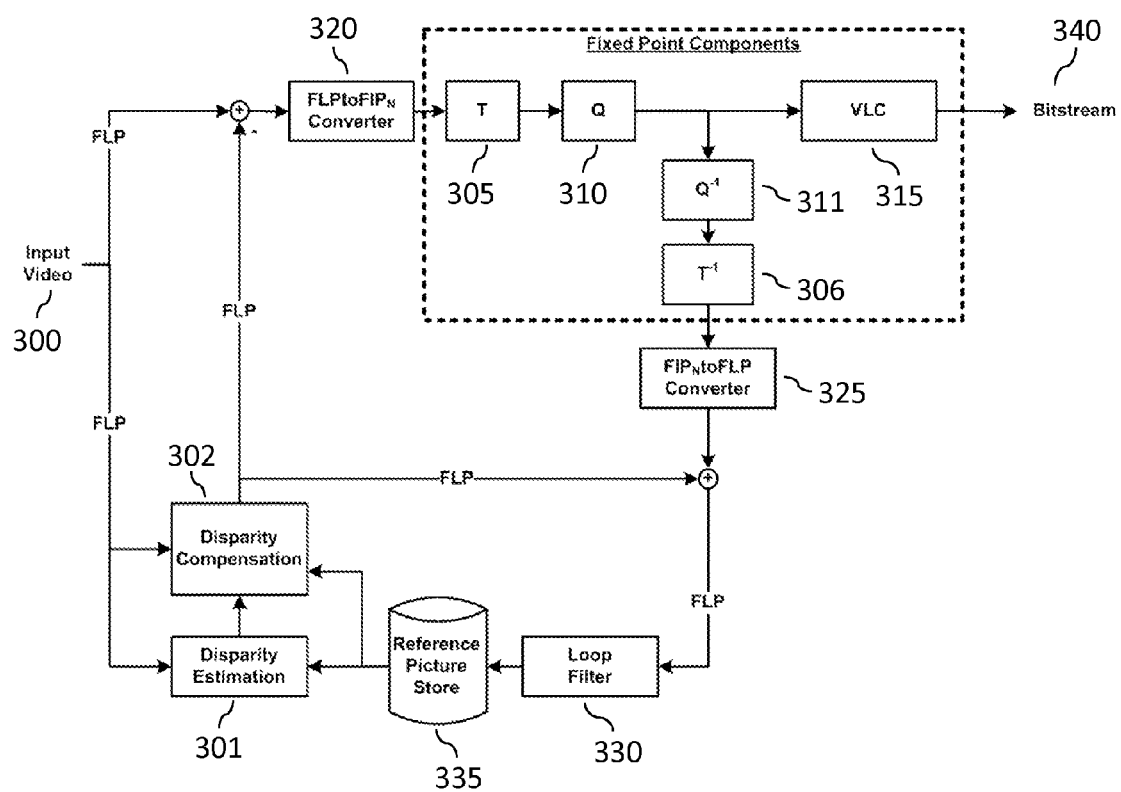
FIG. 3 shows a first embodiment of a video encoder that supports floating point input data and floating point operations.
Figure 4:
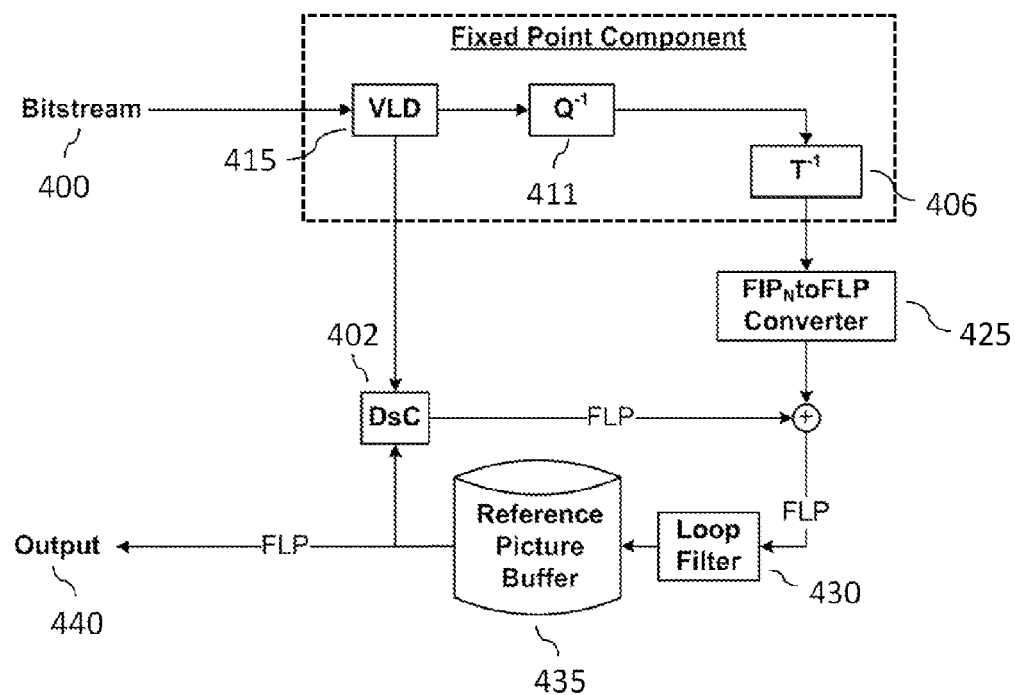
FIG. 4 shows a first embodiment of a video decoder that is adapted to decode information encoded with the video encoder shown in FIG. 3.

In a first embodiment of the extension of existing codec implementations to support floating point numbers and floating point operations, a video encoder and a video decoder shown in FIGS. 3 and 4, respectively, are used. In both the encoder (FIG. 3) and the decoder (FIG. 4), most or all operations apart from transformation (305, 306, 406), quantization (310, 311, 411), and entropy encoding/decoding (315, 415) processes can be performed using floating point operations. In other words, most or all prediction operations are extended to consider floating point processing, including motion estimation and compensation, weighted prediction, interpolation, intra prediction, and so forth. Other operations, such as loop filtering/deblocking, can also be performed using floating point processing.

On the other hand, the transformation (305, 306, 406) and quantization (310, 311, 411) processes are performed using fixed point arithmetic of a certain precision (for instance, 16, 32, or 64 bits). This involves a floating point to fixed point conversion (320) at the encoder prior to the transformation (305) and quantization (310) processes, while a fixed point to floating point conversion (325, 425) is performed prior to reconstruction of picture information at both the encoder and decoder.

Specifically, FIG. 3 shows a first embodiment of a video encoder. The video encoder takes as input video data (300), which comprises pictures, and outputs a bitstream (340), which comprises encoded video information and information associated with the encoded video information, suitable to be sent to a video decoder. The video encoder comprises a disparity estimation unit (301), disparity compensation unit (302), floating point to fixed point converter (320), transformation unit (305), quantization unit (310), and entropy encoder (315). These components perform, respectively, disparity estimation (301), disparity compensation (302), floating point to fixed point conversion (320), transformation (305), quantization (310), and entropy encoding (315).

The information associated with the encoded video information includes, by way of example and not of limitation, disparity parameters, quantization parameters, transformation parameters, conversion parameters (for floating point to fixed point conversion and vice versa), as well as header information. Transformation parameters can include type of transformation utilized (such as a Discrete Cosine Transform, Hadamard Transform, and Fourier Transform). Disparity parameters can include information on mode decisions, motion vectors, weighted prediction parameters, intra prediction parameters, reference pictures used (where each reference picture is associated with a reference index), and so forth. Header information generally specifies (in the case of encoded video information) image size, image resolution, file format, and so forth.

As shown in FIG. 3, the video encoder takes as input the video data (300). Disparity estimation (301) is performed on the picture information contained in the input video data (300) and reference pictures from a reference picture buffer (335) in order to obtain disparity parameters to be applied to the pictures in the input video data (300). Disparity compensation (302) is performed by applying the disparity parameters to the pictures in the input video data (300), thus resulting in prediction pictures or regions. Residuals can then be obtained by taking a difference between the pictures in the input video data (300) and the prediction pictures or regions generated by the disparity compensation (302). The residuals are then converted (320) from a floating point representation to a fixed point representation. Transformation (305) followed by quantization (310) are performed on the converted residuals. The entropy encoding (315) can be, for instance, variable length encoding using the universal variable length coding method (Exp-Golomb), variable length encoding based on predefined variable length entries, or context adaptive binary arithmetic coding, among others.

The resulting information from the transformation (305) and quantization (310) is then entropy encoded (315) to generate a bitstream (340), which is suitable to be sent to a decoder. The resulting information can comprise residual information. The information associated with the resulting information (disparity parameters, quantization parameters, and so forth) can be entropy encoded (315) as part of the bitstream (340) containing the resulting information or entropy encoded (315) into a bitstream separate from the bitstream (340) containing the resulting information. As an example, a reference index can be assigned to each reference picture in the reference picture buffer (335), where the reference index of the reference picture utilized by the encoder can be sent to a decoder in the bitstream (340). The decoder then utilizes the reference picture associated with the reference index provided by the encoder in the decoding process (described later in the present disclosure).

Furthermore, the encoder of FIG. 3 can signal the precision that is to be used when converting the floating point number to a fixed point number (320), and vice versa (325), by including the precision as part of the bitstream (340) (for instance, within a picture parameter set or slice header). The signaling allows flexibility on how to encode the residual data and can improve coding performance. An additional value could also be signaled that would provide an extra bias for the exponent part of the floating point representation, which could enable extending the dynamic range of the representation or provide higher precision for a certain range of values if necessary.

It should be noted that FIG. 3 also shows a system and method for generating reference pictures that can be stored in a reference picture buffer (335). Specifically, after the quantization (310) of the residuals by the quantization unit (310), inverse quantization (311) and inverse transformation (306) are performed on the quantized residuals using an inverse quantization unit (311) and an inverse transformation unit (306), respectively. The residual output from the inverse transformation unit (306) is then converted (325) from a fixed point representation to a floating point representation using a fixed point to floating point converter unit (325). The prediction pictures or regions resulting from the disparity compensation (302) are added to this residual, which now is in a floating point representation, to reconstruct pictures. These reconstructed pictures can be stored as reference pictures in the reference picture buffer (335). Alternatively, an additional step of deblocking (330) by a loop filter (330) can be performed on the reconstructed pictures to reduce artifacts resulting, for instance, from quantization or block based motion compensated prediction. These pictures generated from the loop filter (330) can then be stored as reference pictures in the reference picture buffer (335).

Information associated with the encoded video information can also include deblocking parameters and decoder picture buffer management parameters. Each of these parameters can be signaled within the bitstream (340) or as a separate bitstream to the decoder. Decoder picture buffer management parameters include, for example, manner in which to add and/or remove reference pictures from the reference picture buffer (335) and manner in which to assign a reference index to a reference picture. As an example of the former, when a new reference picture is generated and the reference picture buffer (335) is full, the decoder picture buffer management determines whether or not to keep the new reference picture and, if kept, which of the old reference pictures to remove. One example would be a first-in-first-out (FIFO) implementation, where an oldest reference picture in the reference picture buffer (335) is removed when the buffer (335) is full and a new reference picture is generated and suitable to be added to the reference picture buffer (335).

FIG. 4 shows a decoder suitable for decoding the bitstream (340 in FIGS. 3 and 400 in FIG. 4) received from the encoder in FIG. 3. The video decoder takes as input the bitstream (400) from an encoder (such as that in FIG. 3) and outputs an output bitstream (440), which comprises output picture information. The video decoder comprises an entropy decoder (415), disparity compensation unit (402), inverse quantization unit (411), inverse transformation unit (406), fixed point to floating point converter (425), and loop filter (430). These components perform, respectively, entropy decoding (415), disparity compensation (402), inverse quantization (411), inverse transformation (406), fixed point to floating point conversion (425), and deblocking (430). The entropy decoding (415) can be, for instance, variable length decoding using universal variable length coding method (Exp-Golomb), variable length decoding based on predefined variable length entries, or context adaptive binary arithmetic coding, among others.

As shown in FIG. 4, the video decoder takes as input the bitstream (400), which comprises encoded image data and can comprise information associated with the encoded image data. In the case that the bitstream (400) arrives from the video encoder of FIG. 3, the bitstream (400) comprises residuals in fixed point representation and can comprise information associated with the residuals. Entropy decoding (415) is performed on the bitstream (400) to extract and decode encoded image data from the bitstream (400), thus obtaining an entropy decoded image (or simply referred to as a processed or decoded image). Inverse quantization (411) and inverse transformation (406) are then performed on the entropy decoded image. A resulting image of the inverse transformation (406) is converted (425) from a fixed point representation to a floating point representation to obtain an image in floating point representation. The image, which comprise residuals when the bitstream (400) arrives from the video encoder of FIG. 3, is added to one or more prediction pictures or regions, formed by performing disparity compensation (402) based on the entropy decoded image and reference pictures from a reference picture buffer (435), to obtain a reconstructed picture. Deblocking (430) can be performed on the reconstructed picture. Outputs of the deblocking (430) performed at the loop filter (430) are decoded pictures, which serves as an output (440) of the decoder and can be stored in the reference picture buffer (435) for use in decoding future pictures sent into the decoder for decoding.

It should be noted that the bitstream (400) can additionally comprise information associated with the encoded image data. As previously mentioned, the associated information includes, by way of example and not of limitation, disparity parameters, quantization parameters, transformation parameters, and conversion parameters that are utilized by an encoder (such as the encoder of FIG. 3). For example, with reference back to the decoder in FIG. 4, the inverse quantization (411) can be performed with consideration to quantization parameters obtained from the encoder. Similarly, the inverse transformation (406) and the disparity compensation (402) performed at the decoder can be performed with consideration to transformation and disparity parameters, respectively, provided by the encoder.

Figure 5:
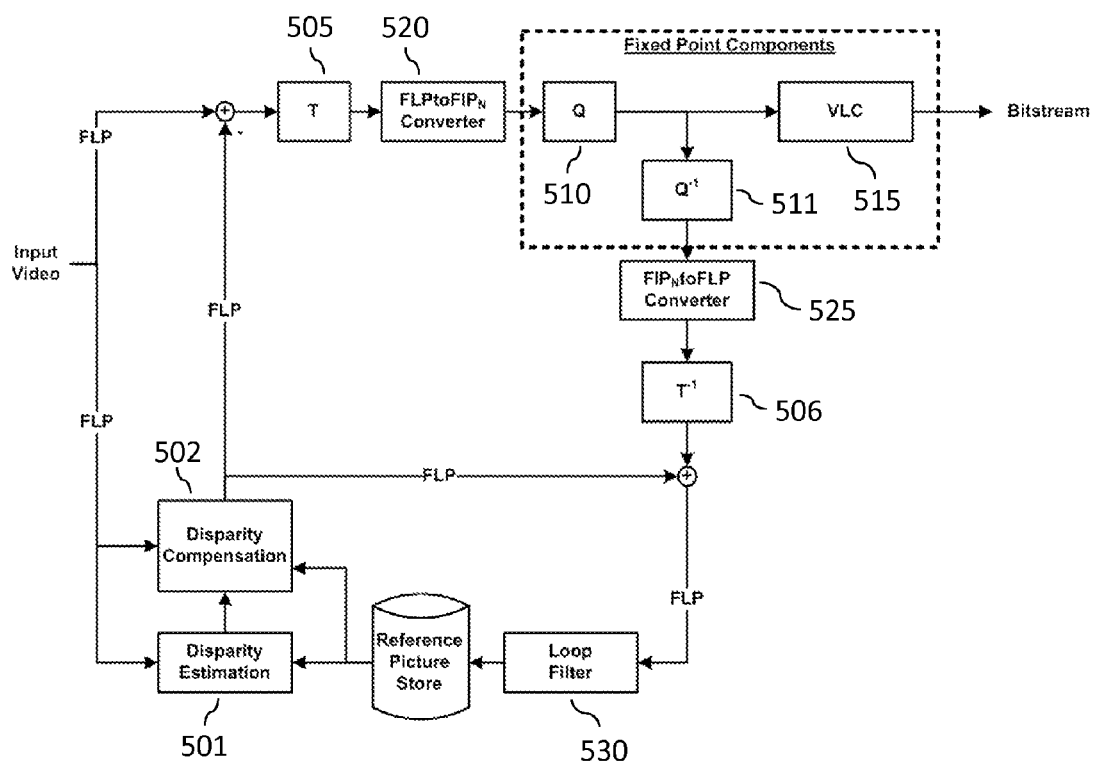
FIG. 5 shows a second embodiment of a video encoder that supports floating point input data and floating point operations.
Figure 6:
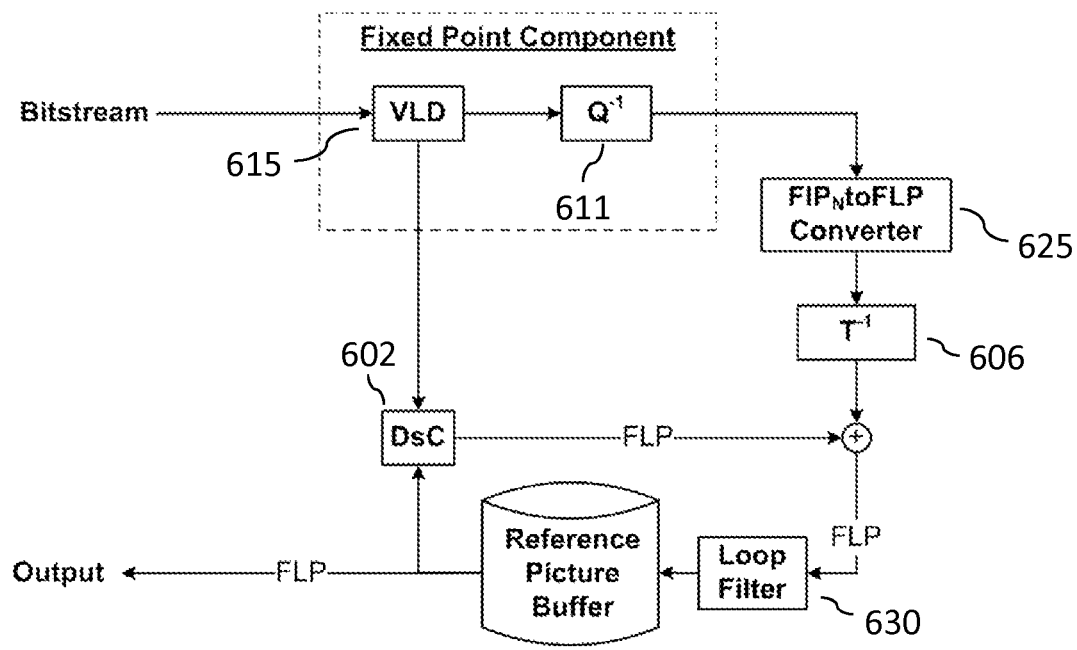
FIG. 6 shows a second embodiment of a video decoder that is adapted to decode information encoded with the video encoder shown in FIG. 5.

In a second embodiment of the extension of existing codecs to support floating point numbers, a video encoder and a video decoder, shown in FIGS. 5 and 6 respectively, are used. In both the encoder (FIG. 5) and the decoder (FIG. 6), all operations apart from quantization (510, 511, 611) and entropy encoding/decoding (515, 615) processes can be performed using floating point operations. Specifically, transformation (505, 506, 606) processes can be performed using floating point operations. Floating point to fixed point conversion (520) and fixed point to floating point conversion (525, 625) occur prior to the quantization (510) and after the inverse quantization (511, 611), respectively. Coding performance can be improved through use of higher precision during the transformation (505, 506, 606) processes.

As previously mentioned, although the above discussion of FIGS. 3-6 pertains to processing of pictures and utilization of reference pictures, the steps at the encoder (for example, FIGS. 3 and 5) and the decoder (e.g., FIGS. 4 and 6) can be performed on regions, macroblocks, blocks, or pixels within the pictures. As an example, with reference to the encoder in FIG. 3 and the decoder in FIG. 4, consider a case where processing occurs on regions of picture information in the video data (300). It should be noted at the onset that the description of FIGS. 3 and 4 in the case of processing at the region level remains similar to the case of processing at the picture/image level as previously discussed.

With reference first to FIG. 3, the video encoder takes as input the video data (300). Input pictures contained in the video data (300) can be segmented into regions based on image characteristics in different portions of the pictures. Disparity estimation (301) is performed for regions within the input pictures contained in the input video data (300) and regions within one or more reference pictures from a reference picture buffer (335) in order to obtain disparity parameters to be applied to regions within the input pictures. Disparity compensation (302) is performed by applying the disparity parameters to the regions of the input pictures, thus resulting in a plurality of prediction pictures or regions. Residuals can then be obtained by taking a difference between the regions of the input pictures and corresponding prediction pictures or regions generated through disparity compensation (302). These residuals are then converted (320) from a floating point to a fixed point representation. Transformation (305) followed by quantization (310) are performed on the converted residuals.

The resulting information from the transformation (305) and quantization (310) can be entropy encoded (315) into a bitstream (340) along with or separate from information associated with the resulting information. Similar to the case at the picture level, at the region level, each region has one or more sets of associated information such as disparity parameters, quantization parameters, transformation parameters, converting parameters (e.g., floating point to fixed point conversion and vice versa), reference indices, deblocking parameters, header information, and so forth, as well as precision utilized in each of the transformations (305, 306), quantizations (310, 311), conversions (320, 325), etc.

At the decoder side, with reference to FIG. 4, the video decoder takes as input the bitstream (400), which comprises encoded image data and can comprise information associated with the encoded image data, and outputs an output bitstream (440) that comprises output picture information. Entropy decoding (415) is performed on the bitstream (400) to extract and decode encoded image data from the bitstream (400), thus obtaining a plurality of entropy decoded images. Inverse quantization (411), inverse transformation (406), and fixed point to floating point conversion (425) are then performed on the entropy decoded images. The resulting images can comprise residual information. Regions of the resulting images are added to one or more prediction pictures or regions to obtain reconstructed regions, which can be used to form reconstructed pictures. Prediction pictures or regions are obtained based on entropy decoded images, reference pictures (and regions thereof) from the reference picture buffer (435), as well as any disparity parameters sent from the encoder to the decoder. Deblocking (430) can be performed on the reconstructed pictures and regions within the reconstructed pictures. Outputs of the deblocking (430) performed at the loop filter (430) are decoded pictures and regions, which serve as outputs (440) of the decoder and can be stored in the reference picture buffer (435) for use in decoding future image data sent into the decoder for decoding.

For each of the first and second embodiments of the extension, floating point operations are performed in the disparity estimation (301, 501), disparity compensation (302, 402, 502, 602), and deblocking (330, 430, 530, 630) processes. In the second embodiment, the transformations (505, 506, 606) are also performed using floating point operations. Precision of each of these floating point operations can be the same or can be different from each other. The precision of each of the floating point operations performed at the encoder (shown in FIGS. 3 and 5) can then be signaled to the decoder (shown in FIGS. 4 and 6).

Alternatively, some of these operations, such as disparity estimation (motion estimation, weighted prediction, intra prediction, parts of the mode decision process, and so forth), disparity compensation, and transformations (in the encoder and decoder of FIGS. 5 and 6, respectively), could also be performed using fixed point precision as an approximation. However, normative components such as disparity compensation are generally performed using floating point precision. Although using fixed point precision yields loss in prediction accuracy, complexity reduction can be significant.

It should be noted that all floating point arithmetic operations defined in and performed by these extensions to existing video coding standards should follow a particular set of rules and methods. For example, the floating point arithmetic operations can be performed by following the IEEE 754 standard binary16 (half precision), binary32 (single precision) formats, and binary64 (double precision) formats. In some implementations, a combination of these formats can be used. For instance, motion compensation computations can be performed using the binary32 format while transformation computations can be performed using the binary16 format. However, the precision should be well defined and consistently used throughout all implementations of a particular extension.

Specifically, for a given extension to an existing standard, precisions for each of the computations (such as those for motion compensation and transformation) should be well defined. For example, once the extension is defined as using the binary32 format for motion compensation computations and the binary16 format for transformation computations, the extension will not be compatible with motion compensation and transformation computations performed in formats of lower precision. In the above example, the binary32 format can be used for transformation computations, which are defined as using binary16 format computations in the extension of the above example, since the binary32 format includes all values contained in the binary16 format. In contrast, the binary16 format should not be used with motion compensation computations since the extension defines use of binary32 format for the motion compensation computations. Use of the binary16 format (or any format of lower precision than the binary32 format) for motion compensation computations may yield ill-defined results in the extension of the above example.

Furthermore, precision of certain operations, such as multiplication and division, should also be well defined. In this manner, precision mismatches between systems utilizing the same extension can be reduced, which generally yields more accurate decoded information. As previously mentioned, fixed point approximations can be used to eliminate mismatches between floating point operations due to inconsistencies in the implementation of floating point arithmetic across different devices and systems.

In an alternative embodiment of the extension, instead of performing all operations using floating point precision, some of the more costly operations, which may also result in floating point inaccuracies and drift due to the implementation of such operations across different devices and systems, could be alternatively performed using fixed point precision. As an example, interpolation utilized for motion compensation, weighted prediction, transformation, and loop filtering usually involve multiplication operations and at times division operations, operations which can be expensive (in terms of computational time, complexity, and/or power) to implement.

Although input data can still be represented as floating point data, these operations can use fixed point arithmetic of a certain high precision such as 32 or 64 bit integers, after a floating point to fixed point conversion of the input data. As an example, motion compensated interpolation can be performed by first converting an original reference picture data of floating point representation to an int32 fixed point representation, performing interpolation using only integer arithmetic, and finally converting the interpolated samples to a floating point representation for computation (e.g., in the encoder) and/or consideration/addition of the residual signal (e.g., for reconstruction of a final picture at both the encoder and decoder). Higher fixed point precision, if available, can be used throughout such a codec as well in combination to perform the various computations (such as for motion estimation and compensation, transformation, and loop filtering) as an alternative to performing these computations using floating point precision.

It should be noted that, similar to floating point arithmetic operations defined in and performed by extensions to existing video coding standards, fixed point arithmetic operations should also follow a particular set of rules and methods. For example, fixed point arithmetic operations may lead to a fractional component, where specific rounding rules (which may implement, for instance, a rounding offset) may be used to determine whether to round up, round down, or simply truncate the fractional component.

Selection between using floating point representations and fixed point representations can involve taking into consideration range of represented values and accuracy of operations. In some cases, although floating point precision allows for a wider range of values to be represented for a given number of bits, fixed point precision can be used instead of floating point precision for convenience or for ease of computations and/or implementations. For example, floating point division can be computationally costly and can introduce errors in the computation (such as when dividing large numbers). In such a case, it may be preferable to utilize division using fixed precision, such as precision based on int64 representations, which can represent numbers using, for instance, binary32 representations while better handling any errors in the computation than does the floating point division. Divisions can also be, in many cases, converted to shift operations, considerably reducing complexity.

In each of the embodiments, it is also possible that the input data to be encoded are fixed point data. The higher precision that can be achieved using floating point arithmetic can provide encoding benefits compared to fixed point codecs. This higher precision (and resulting encoding benefits) can be achieved by first converting fixed point data to floating point data and then encoding the floating point data using the embodiments of the floating point extensions to existing video coding standards. The conversion parameters used to convert the fixed point data to floating point, such as scaling and offset if any, can be signaled as part of the bitstream and used for conversion, during decoding, back to the original fixed point representation.

The methods and systems described in the present disclosure may be implemented in hardware, software, firmware, or combination thereof. Features described as blocks, modules, or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

The examples set forth above are provided to give those of ordinary skill in the art a complete disclosure and description of how to make and use the embodiments of the floating point video coding of the disclosure, and are not intended to limit the scope of what the inventors regard as their disclosure. Modifications of the above-described modes for carrying out the disclosure may be used by persons of skill in the video art, and are intended to be within the scope of the following claims.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a", "an", and "the" include plural referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

List of References

[1] Greg Ward, "High Dynamic Range Image Encodings", 2006. Online: HTML world wide website anyhere.com/gward/hdrenc/hdr_encodings. Most recently accessed Feb. 20, 2011.

The invention claimed is:

1. A method for encoding an input video into a bitstream, the input video comprising image data, the method comprising:
 a) performing disparity estimation based on reference pictures from a reference picture buffer and an input picture of the input video to obtain disparity parameters;
 b) performing disparity compensation by applying the disparity parameters obtained from performing disparity estimation to the reference pictures to generate a prediction picture or prediction regions;
 c) taking a difference between the input picture of the input video and the prediction picture or the prediction regions to provide residual information;
 d) converting the residual information from a floating point representation to a fixed point representation to provide converted residual information;
 e) performing transformation and quantization on the converted residual information to obtain processed residual information; and
 f) performing entropy encoding on the processed residual information to generate the bitstream,
 wherein the image data comprises fixed point data, further comprising before the performing disparity estimation and disparity compensation:
 converting the fixed point data from a fixed point representation to a floating point representation, wherein conversion parameters used in the fixed point data converting are signaled to a decoder.

2. The method of claim 1, wherein the conversion parameters are signaled as part of the bitstream to the decoder.

3. The method of claim 1, wherein one or more operations in at least one of the performing disparity estimation, the performing disparity compensation, and the taking a difference are performed using fixed point operations.

4. A method for encoding an input video into a bitstream, the input video comprising image data, the method comprising:
 a) performing disparity estimation based on reference pictures from a reference picture buffer and an input picture of the input video to obtain disparity parameters;
 b) performing disparity compensation by applying the disparity parameters obtained from performing disparity estimation to the reference pictures to generate a prediction picture or prediction regions;
 c) taking a difference between the input picture of the input video and the prediction picture or the prediction regions to provide residual information;
 d) performing transformation on the residual information to provide transformed residual information;
 e) converting the transformed residual information from a floating point representation to a fixed point representation to provide a converted residual information;
 f) performing quantization on the converted residual information to provide quantized residual information; and
 g) performing entropy encoding on the quantized residual information to obtain the bitstream,
 wherein the image data comprises fixed point data, further comprising before the performing disparity estimation and disparity compensation:
 converting the fixed point data from a fixed point representation to a floating point representation, wherein conversion parameters used in the fixed point data converting are signaled to a decoder.

5. The method of claim 4, wherein the conversion parameters are signaled as part of the bitstream to the decoder.

6. The method of claim 5, wherein one or more operations in at least one of the performing disparity estimation, the performing disparity compensation, the taking a difference, and the performing transformation are performed using fixed point operations.

7. The method of claim 5 wherein precision for each of a) through g) can be the same or can be different from each other.

8. The method of claim 1, wherein:
 each reference picture in the reference picture buffer is associated with a reference index, the performing entropy encoding is additionally performed on associated information to obtain the bitstream, and
 the associated information comprises one or more of disparity parameters used in the performing disparity compensation, conversion parameters used in the converting the residual information, transformation parameters used in the performing transformation, quantization parameters used in the performing quantization, and reference indices associated with the reference pictures used in the performing disparity estimation and compensation.

9. The method of claim 1, wherein the performing disparity estimation and disparity compensation and the taking a difference are based at least on regions within the input picture and regions within the reference pictures.

10. A method for decoding a bitstream to obtain an output image, comprising:
   a) providing the bitstream, wherein the bitstream comprises encoded image data;
   b) performing entropy decoding on the bitstream to obtain a processed image_and disparity parameters;
   c) performing inverse quantization and inverse transformation on the processed image to obtain a non-transformed image;
   d) converting the non-transformed image from a fixed point representation to a floating point representation to provide a converted image;
   e) performing disparity compensation based on reference pictures from a reference picture buffer and the disparity parameters to generate a disparity compensated image; and
   f) generating a reconstructed image based on the converted image and the disparity compensated image,
   wherein the reconstructed image comprises the output image, and
   converting the output image from the floating point representation to a fixed point representation based on conversion parameters received via signaling from an encoder.

11. The method of claim 10, further comprising, after the generating a reconstructed image:
   performing deblocking on the reconstructed image to obtain the output image.

12. The method of claim 9, wherein one or more operations in the performing disparity compensation are performed using fixed point operations.

13. The method of claim 11, wherein one or more operations in at least one of the performing disparity compensation and the deblocking are performed using fixed point operations.

14. The method of claim 9, wherein the bitstream comprises residual information, and each of steps b) through d) is performed on the residual information.

15. A method for decoding a bitstream to obtain an output image, comprising:
   a) providing the bitstream, wherein the bitstream comprises encoded image data;
   b) performing entropy decoding on the bitstream to provide a processed image and disparity parameters;
   c) performing inverse quantization on the processed image to obtain a non-quantized image;
   d) converting the non-quantized image from a fixed point representation to a floating point representation to provide a converted image;
   e) performing inverse transformation on the converted image to provide a non-transformed image;
   f) performing disparity compensation based on reference pictures from a reference picture buffer and the disparity parameters to generate a disparity compensated image; and
   g) generating a reconstructed image based on the non-transformed image and the disparity compensated image,
   wherein the reconstructed image comprises the output image, and
   converting the output image from the floating point representation to a fixed point representation based on conversion parameters received via signaling from an encoder.

16. The method of claim 15, further comprising:
   performing deblocking on the reconstructed image to obtain the output image.

17. The method of claim 15, wherein one or more operations in at least one of the performing disparity compensation and the performing inverse transformation are performed using fixed point operations.

18. The method of claim 16, wherein one or more operations in at least one of the performing disparity compensation, the performing inverse transformation, and the performing deblocking are performed using fixed point operations.

19. A method for generating a new reconstructed reference picture adapted to be stored in a reference picture buffer, the new reconstructed reference picture generated from an input video comprising image data, the method comprising:
   a) performing disparity estimation based on reference pictures from the reference picture buffer and an input picture of the input video to obtain disparity parameters;
   b) performing disparity compensation by applying the disparity parameters obtained from performing disparity estimation to the reference pictures to generate a prediction picture or prediction regions;
   c) taking a difference between the input picture of the input video and the prediction picture or the prediction regions to provide a first set of residual information;
   d) converting the first set of residual information from a floating point representation to a fixed point representation to provide a first set of converted residual information;
   e) performing transformation and quantization on the first set of converted residual information to obtain a first set of processed residual information;
   f) performing inverse quantization and inverse transformation on the first set of processed residual information to obtain a second set of residual information;
   g) converting the second set of residual information from a fixed point representation to a floating point representation to provide a second set of processed residual information; and
   h) generating the new reconstructed reference picture based on the prediction picture or the prediction regions and the second set of processed residual information, wherein the new reconstructed reference picture is stored in the reference picture buffer,
   wherein the image data comprises fixed point data, further comprising before the performing disparity estimation and disparity compensation:
   converting the fixed point data from a fixed point representation to a floating point representation.

20. An encoder adapted to receive an input video and output a bitstream, the input video comprising image data, the encoder comprising:
   a disparity estimation unit, wherein the disparity estimation unit is adapted to determine disparity parameters based on reference pictures of a reference picture buffer and an input picture of the input video;
   a disparity compensation unit connected with the disparity estimation unit, wherein the disparity compensation unit is adapted to a generate prediction picture or prediction regions based on the disparity parameters;
   a converting unit connected with the disparity compensation unit, wherein the converting unit is adapted to convert a difference between the input picture of the input video and the prediction picture or the prediction regions from a floating point representation to a fixed point representation, and wherein the difference is residual information;

a transforming unit connected with the converting unit, wherein the transforming unit transforms the converted residual information to obtain transformed information;

a quantizing unit connected with the transforming unit, wherein the quantizing unit quantizes the transformed information to obtain quantized information; and an entropy encoding unit connected with the quantizing unit, wherein the entropy encoding unit is adapted to generate the bitstream from the quantized information, wherein the image data comprises fixed point data and the fixed point data is converted from a fixed point representation to a floating point representation before the input video is input into the disparity estimation unit, wherein conversion parameters used in the fixed point data converting are signaled to a decoder.

21. The encoder of claim 20, further comprising:

an initial converting unit connected with the disparity estimation unit, the disparity compensation unit, and the converting unit, wherein the initial converting unit converts the fixed point data from a fixed point representation to a floating point representation.

22. A decoder adapted to receive a bitstream from an encoder and output an output image, the bitstream comprising encoded image data, the decoder comprising:

an entropy decoding unit, wherein an input to the entropy decoding unit comprises the bitstream;

an inverse quantizing unit connected with the entropy decoding unit, wherein the inverse quantizing unit is adapted to remove quantization performed by the encoder;

an inverse transforming unit connected with the inverse quantizing unit, wherein the inverse transforming unit is adapted to remove transformation performed by the encoder;

a converting unit connected with the transforming unit, wherein the converting unit is adapted to convert an input from the transforming unit from a fixed point representation to a floating point representation; and a disparity compensation unit connected with the entropy decoding unit, wherein an input to the disparity compensation unit is based on an output of the entropy decoding unit and reference pictures of a reference picture buffer and/or regions within the reference pictures, wherein the output image of the decoder is based on an output of the disparity compensation unit, the output of the converting unit, and the reference pictures of the reference picture buffer and/or regions within the reference pictures, wherein the output image is converted from the floating point representation to a fixed point representation based on conversion parameters received via signaling from the encoder.

23. The decoder of claim 22, further comprising:

a loop filter coupled with the disparity compensation unit and the converting unit, wherein the loop filter performs deblocking on a sum of the output of the disparity compensation unit and the output of the converting unit to obtain the output image of the decoder.

24. A decoder adapted to receive a bitstream from an encoder and output an output image, the bitstream comprising encoded image data, the decoder comprising:

an entropy decoding unit, wherein an input to the entropy decoding unit comprises the bitstream;

an inverse quantizing unit connected with the entropy decoding unit, wherein the inverse quantizing unit is adapted to remove quantization performed by the encoder;

a converting unit connected with the inverse quantizing unit, wherein the converting unit is adapted to convert an input from the inverse quantizing unit from a fixed point representation to a floating point representation;

an inverse transforming unit connected with the converting unit, wherein the inverse transforming unit removes transformation performed by the encoder; and a disparity compensation unit connected with the entropy decoding unit, wherein an input to the disparity compensation unit is based on an output of the entropy decoding unit- and reference pictures of a reference picture buffer and/or regions within the reference pictures, wherein the output image of the decoder is based on an output of the disparity compensation unit, the output of the inverse transforming unit, and the reference pictures of the reference picture buffer and/or regions within the reference pictures, wherein the output image is converted from the floating point representation to a fixed point representation based on conversion parameters received via signaling from the encoder.

25. The decoder of claim 24, further comprising:

a loop filter coupled with the disparity compensation unit and the converting unit, wherein the loop filter performs deblocking on a sum of the output of the disparity compensation unit and the output of the inverse transforming unit to obtain the output image of the decoder.

* * * * *